United States Patent
Kai

(10) Patent No.: US 11,331,577 B2
(45) Date of Patent: May 17, 2022

(54) GAME PROGRAM AND GAME SYSTEM

(71) Applicant: SQUARE ENIX CO., LTD., Tokyo (JP)

(72) Inventor: Takaaki Kai, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 34 days.

(21) Appl. No.: 16/926,333

(22) Filed: Jul. 10, 2020

(65) Prior Publication Data
US 2021/0008454 A1    Jan. 14, 2021

(30) Foreign Application Priority Data
Jul. 10, 2019 (JP) .............................. JP2019-128196

(51) Int. Cl.
*A63F 13/58* (2014.01)

(52) U.S. Cl.
CPC .................................... *A63F 13/58* (2014.09)

(58) Field of Classification Search
None
See application file for complete search history.

(56) References Cited

U.S. PATENT DOCUMENTS

| | | | | |
|---|---|---|---|---|
| 8,990,715 B1* | 3/2015 | Harp | ...................... | G06N 3/006 715/763 |
| 2010/0057715 A1* | 3/2010 | Bates | ...................... | G06F 21/31 707/E17.014 |
| 2019/0111344 A1* | 4/2019 | Hiroki | ................... | A63F 13/833 |
| 2020/0122040 A1* | 4/2020 | Juliani, Jr. | ............ | G06K 9/6256 |
| 2021/0001229 A1* | 1/2021 | Somers | ................... | A63F 13/35 |

FOREIGN PATENT DOCUMENTS

| | | |
|---|---|---|
| JP | 2015091377 A | 5/2015 |
| JP | 2018043160 A | 3/2018 |

OTHER PUBLICATIONS

[Online] a Method of reminding the technique of the case! a method of acquiring a heartpoint of a heart and a method of acquiring a heartpoint of a heart! [Pomonmon],https://pokemon.gamepedia.jp/sm/archives/60842, Nov. 3, 2016.

[Online] "Jojo SS", a favorite unit of which is grown to the maximum extent, https://app.famitsu.com/20140425_360980/, Apr. 25, 2014.

[Online] Kirby Super Star Instruction, https://www.nintendo.co.jp/clvs/manuals/ka/pdf/CLV-P-VAAQJ.pdf, accessed Feb. 8, 2019.

(Continued)

*Primary Examiner* — Sunit Pandya
(74) *Attorney, Agent, or Firm* — Dorsey & Whitney LLP

(57) ABSTRACT

A game program causes a computer to implement a function of controlling progress of a video game in which a virtual game medium exhibits an ability in the game, a relationship setting function of setting a predetermined relationship between a first game medium and a second game medium selected from a plurality of game media based on a setting operation of a user, and an ability setting function of additionally setting the same ability as at least one ability of the first game medium in the second game medium in a case where a predetermined condition is established.

8 Claims, 21 Drawing Sheets

(56) References Cited

OTHER PUBLICATIONS

[Online] pixiv Encyclopedia, https://web.archive.org/web/20161218155140/http://dic.pixiv.net/a/%E3%82%B4%E3%82%B4, Dec. 18, 2016.
Office Action for JP Application No. 2019-128196 dated Mar. 30, 2021 and English translation thereof.
[Legends] What is Instruction? Method and conditions | Characters that can be instructed, List of techniques, [Online]AppMedia, Jun. 8, 2018, [Search: Jul. 9, 2020], URL: https://appmedia.jp/dbLe/2038876.
3rd Order Skill transfer, tutorial improvement, equipment, [Online] Age of Discovery Online official website, Aug. 8, 2017, [Search on Jul. 9, 2020], URL: https://www.gamecity.ne.jp/dol/topics_cms/update/6414.html.
Dojo, [Online] Imperial Saga strategy summary wiki, Jul. 1, 2015 1st, [Search on Jul. 9, 2020], URL, https://web.archive.org/web/20150711154921/https://wiki.famitsu.com/imperiaisaga/ 技遭場.
Office Action for JP Application No. 2019-128196, dated Jul. 21, 2020.

\* cited by examiner

FIG.15(A)
USER DATA

| USER ID | NAME | POSSESSED CHARACTER | MASTER-STUDENT RELATIONSHIP ||| POSSESSED ITEM | PARTY | ... |
| --- | --- | --- | --- | --- | --- | --- | --- | --- |
| | | | MASTER ID | STUDENT ID | TRAINING RECORD | | | |
| U01-512 | KEN | * | CH004 | CH001 | MASTER | *,*,*,... | CH001, CH004, *** | ... |
| | | | *** | *** | Q01-003,Q01-011 | | | |
| | | | *** | *** | *** | | | |
| | | | *** | *** | *** | | | |

FIG.15(B)
POSSESSED CHARACTER

| CHARACTER ID | LEVEL | MASTER ID | PARAMETER |
| --- | --- | --- | --- |
| CH001 | 50 | PS110 | HP, ATTACK POWER, DEFENSE POWER, ... |
| *** | 10 | *** | HP, ATTACK POWER, DEFENSE POWER, ... |
| ... | ... | ... | ... |

FIG.16

CHARACTER LIST

| CHARACTER ID | NAME | BATTLE ID | PASSIVE ID | PERMISSION ID | BASIC PARAMETER | ... |
|---|---|---|---|---|---|---|
| CH001 | CHARACTER A | BS001,BS021, BS095 | PS005,PS010 | PS005 | HP, ATTACK POWER, DEFENSE POWER, ... | ... |
| CH002 | *** | *** | PS090,PS95, PS105 | PS105 | *** | ... |
| CH003 | *** | *** | *** | *** | *** | ... |
| CH004 | CHARACTER Q | *** | PS055,PS110 | PS110 | *** | ... |
| *** | *** | *** | *** | *** | *** | ... |

FIG.17

TRAINING LIST

| TRAINING ID | NAME | CONSUMED ITEM ID | CONSUMED QUANTITY | ... |
|---|---|---|---|---|
| Q01-001 | TRAINING A | S025 | 1 | ... |
| | | – | – | |
| | | – | – | |
| Q01-002 | TRAINING B | S089 | 3 | ... |
| | | S090 | 1 | |
| | | – | – | |
| Q01-003 | TRAINING TT | S025 | 5 | ... |
| | | S055 | 5 | |
| | | S100 | 1 | |

FIG.18

PASSIVE SKILL LIST

| SKILL ID | NAME | ACTIVATION EFFECT | ... |
|---|---|---|---|
| PS001 | ATK+10% | INCREASES ATTACK POWER OF ALL CHARACTERS OF PARTY BY 10% | ... |
| PS002 | ATK+20% | INCREASES ATTACK POWER OF ALL CHARACTERS OF PARTY BY 20% | ... |
| PS003 | DEF+10% | INCREASES DEFENSE POWER OF ALL CHARACTERS OF PARTY BY 10% | ... |
| PS004 | * * * | * * * | ... |
| PS005 | MOVEMENT SPEED UP | INCREASES MOVEMENT SPEED OF HOST (SINGLE UNIT) BY 50% | ... |
| PS006 | DETOXIFICATION | HOST (SINGLE UNIT) DOES NOT RECEIVE POISON ATTACK FOR 60 SECONDS FROM START OF COMBAT | ... |

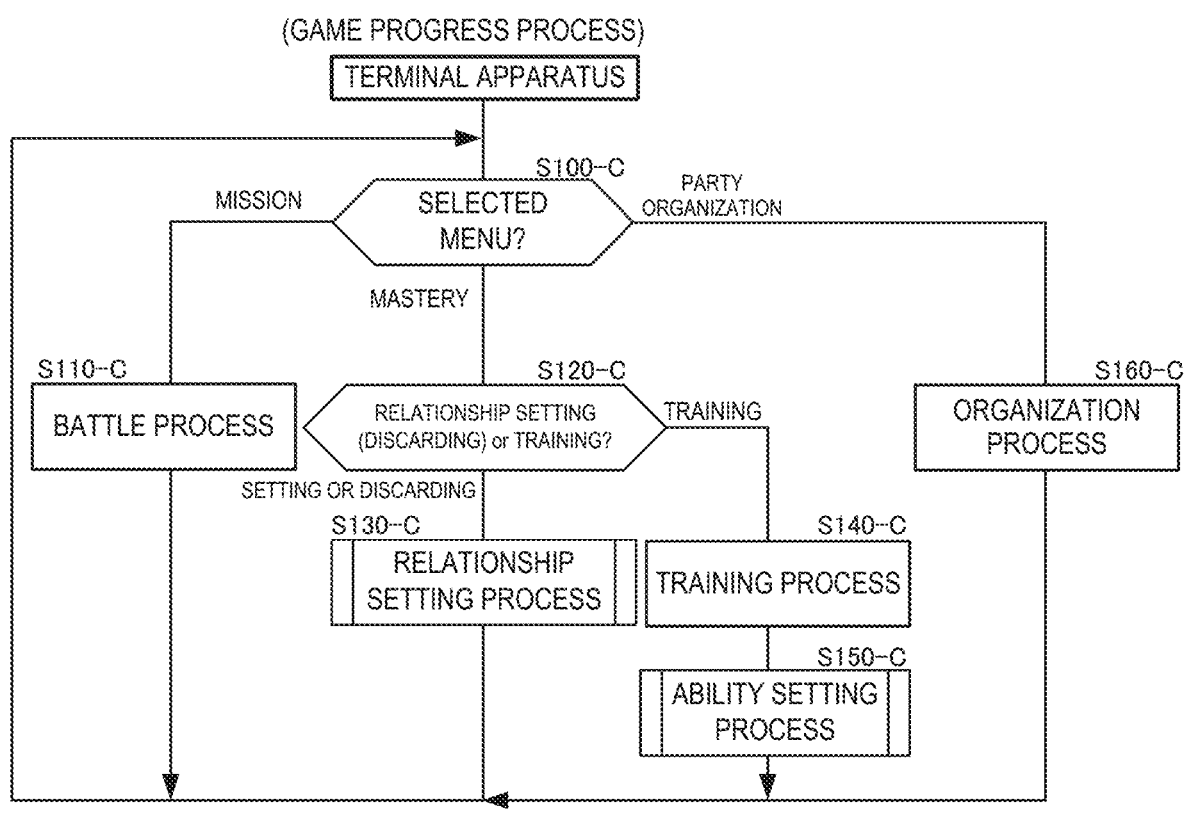

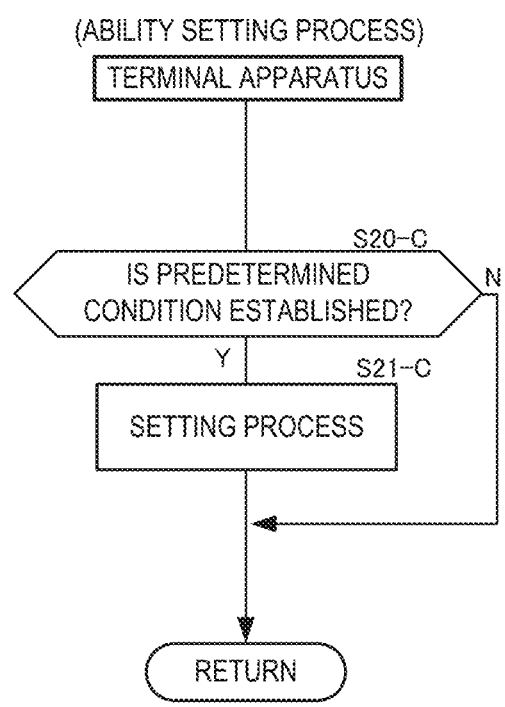

GAME PROGRAM AND GAME SYSTEM

CROSS-REFERENCE TO RELATED APPLICATION

This application is based upon and claims the benefit of priority of the prior Japanese Patent Application No. JP 2019-128196, filed on Jul. 10, 2019, the entire contents of which are incorporated herein by reference.

BACKGROUND OF THE INVENTION

Field of the Invention

The invention relates to a game program and a game system.

Description of Related Art

In smart devices and the like, for example, a video game (game) in which a battle is performed using a virtual game medium such as a card or a character is provided. Examples of such game media, systems, devices and methods may be found in Japanese Published Patent Application No. JP 2015-091377. Thus, an ability of the game medium is an important element in terms of advantageously proceeding in the battle. In JP 2015-091377, a configuration of improving the ability of one game medium by performing a process of combining one game medium with another game medium is disclosed. There are multiple types of abilities such as an active skill such as an attack skill or a magic that is activated by an operation of a user, and a passive skill such as an increase in attack power that does not need an operation of the user. The ability is predetermined for each game medium. Accordingly, an ability included in certain one game medium may not be included in another game medium.

SUMMARY

The game using the virtual game medium has a task of improving the degree of freedom of a user related to setting of the ability of the game medium.

An object of at least one embodiment of the present invention is to solve deficiencies of the related technology.

From a non-limiting viewpoint, a game program according to one embodiment of the present invention is a game program causing a computer to implement a function of controlling progress of a video game in which a virtual game medium exhibits an ability in the game, a relationship setting function of setting a predetermined relationship between a first game medium and a second game medium selected from a plurality of game media based on a setting operation of a user, and an ability setting function of additionally setting the same ability as at least one ability of the first game medium in the second game medium in a case where a predetermined condition is established.

From a non-limiting viewpoint, a game program according to one embodiment of the present invention is a game program causing a server apparatus to control progress of a video game. The server apparatus is connected to a game terminal apparatus executing the video game in which a virtual game medium exhibits an ability in the game through a communication network. The game program causes the server apparatus to implement a relationship setting function of setting a predetermined relationship between a first game medium and a second game medium selected from a plurality of game media based on a setting operation of a user, and an ability setting function of additionally setting the same ability as at least one ability of the first game medium in the second game medium in a case where a predetermined condition is established.

From a non-limiting viewpoint, a game system according to one embodiment of the present invention is a game system including a game terminal apparatus executing a video game in which a virtual game medium exhibits an ability in the game, and a server apparatus connected to the game terminal apparatus through a communication network. The game system includes a relationship setter configured to set a predetermined relationship between a first game medium and a second game medium selected from a plurality of game media based on a setting operation of a user, and an ability setter configured to additionally set the same ability as at least one ability of the first game medium in the second game medium in a case where a predetermined condition is established.

One or two or more deficiencies are solved by each embodiment of the present application.

BRIEF DESCRIPTION OF THE DRAWINGS

FIGS. 15A and 15B are diagrams illustrating one example of user data and a possessed character corresponding to at least one embodiment of the present invention.

FIG. 16 is a diagram illustrating one example of a character list corresponding to at least one embodiment of the present invention.

FIG. 17 is a diagram illustrating one example of a training list corresponding to at least one embodiment of the present invention.

FIG. 18 is a diagram illustrating one example of a passive skill list corresponding to at least one embodiment of the present invention.

FIG. 19 is a flowchart illustrating an example of a game progress process corresponding to at least one embodiment of the present invention.

FIG. 21 is a flowchart illustrating an example of the ability setting process corresponding to at least one embodiment of the present invention.

DESCRIPTION OF EMBODIMENTS

Hereinafter, examples of embodiments of the present invention will be described with reference to the drawings. Various constituents in the example of each embodiment described below can be appropriately combined without causing contradiction or the like. In addition, contents described as an example of a certain embodiment may not be described in another embodiment. In addition, contents of operations and processes not related to a characteristic part of each embodiment may be omitted. Furthermore, the order of various processes constituting various flows described below may be a random order without causing contradiction in processing contents.

First Embodiment

Figure 1:
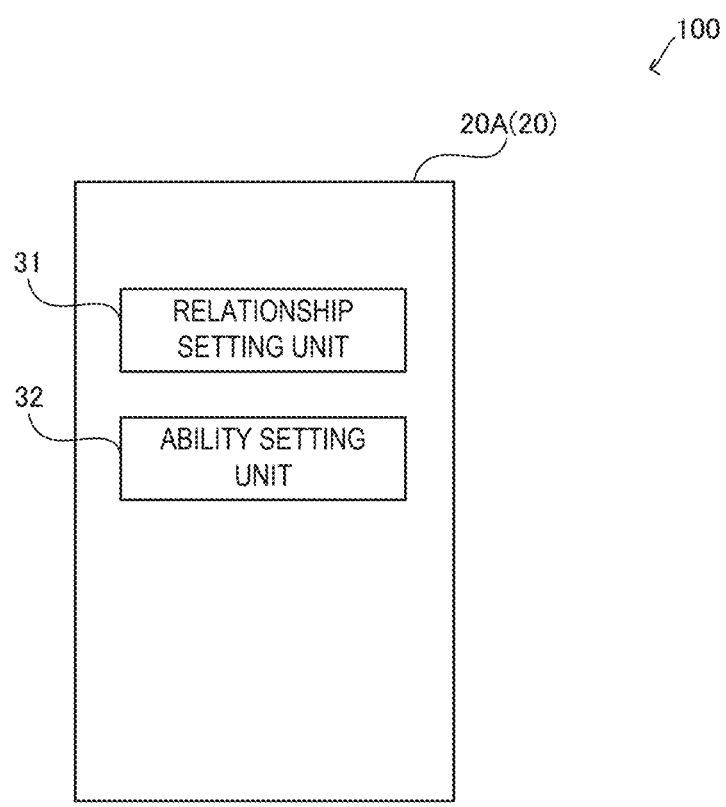
FIG. 1 is a block diagram illustrating an example of a configuration of a game system corresponding to at least one embodiment of the present invention.

FIG. 1 is a block diagram illustrating an example of a configuration of a game system 100 corresponding to at least one embodiment of the present invention. As illustrated in FIG. 1, the game system 100 includes a single terminal apparatus (game terminal apparatus) 20 that is a computer used by a user (player). In FIG. 1, a configuration of a terminal apparatus 20A that is an example of a configuration of a terminal apparatus 20 is illustrated. The configuration of the game system 100 is not limited to the above configuration. For example, a configuration (refer to FIG. 4) in which the terminal apparatus of the user is connected to a server apparatus (video game processing server) through a communication network and a service of a video game is provided to the terminal apparatus from the server apparatus may be available.

The game system 100 has various functions for executing the video game (game) in which a virtual game medium exhibits (activates) an ability in the game. The "game medium" is a virtual object in the game. For example, a card, a character, an avatar, and a piece of a Japanese chess game correspond to the game medium. The game medium is used in a combat or the like.

The "ability" is an ability (skill) set for each game medium and is exhibited in the combat or the like. For example, an active skill and a passive skill correspond to the ability. An attack skill using a weapon, a magic, and the like correspond to the active skill. An attack power increase and the like correspond to the passive skill. The active skill is activated in accordance with an operation (execution instruction) of the user. The passive skill does not need the operation (execution instruction) of the user and is activated depending on establishment of a condition. For example, in a case where being in the combat is the condition, the passive skill is activated at all times in the combat. For example, the passive skill "attack power increase" increases the attack power of the game medium of the user by a predetermined amount at all times in the combat. Exhibition of the ability is a general configuration and thus, will not be described in detail.

In the game of the example of the present embodiment, a function for enabling the ability of a certain game medium to be activated by another game medium is present. Specifically, the user selects a game medium to be set as a first game medium and a game medium to be set as a second game medium from a plurality of game media. In a case where a predetermined condition is established, the same ability as at least one ability of the first game medium is additionally set in the second game medium. That is, the second game medium can exhibit at least one ability of the first game medium. The game media to be set as the first game medium and the second game medium can be selected by the user using an operation unit of the terminal apparatus 20.

Any condition can be applied to the predetermined condition. For example, execution of a predetermined event such as training on the second game medium by consuming a predetermined item by the user may be the predetermined condition.

The terminal apparatus 20 is managed by the user playing the game. The terminal apparatus 20 is configured with a terminal apparatus such as a stationary game apparatus, a personal computer, a mobile phone terminal or personal digital assistants (PDA), a smart device, or a portable game apparatus that can execute the video game.

The terminal apparatus 20 includes the operation unit such as a touch panel, a storage unit such as a hard disk drive, a control unit that is configured with a CPU or the like and generates a game image by executing the game, a display unit displaying the game image, and the like for executing the video game. Such units are general configurations and thus, will not be described in detail. In the terminal apparatus 20, software (game program) for executing the video game and controlling the progress of the game is stored in the storage unit. The game program includes game data.

Next, the configuration of the terminal apparatus 20A which is an example of the configuration of the terminal apparatus 20 will be described. The terminal apparatus 20A includes at least a relationship setting unit (relationship setting function) 31 and an ability setting unit (ability setting function) 32 in order for the control unit to control the progress of the video game by executing the game program.

The relationship setting unit 31 sets a predetermined relationship between the first game medium and the second game medium selected from the plurality of game media based on a setting operation of the user. For example, relationship data that associates identification information of the first game medium with identification information of the second game medium may be stored in the storage unit of the terminal apparatus 20A by including the relationship data in user data. The user data is data of the user related to the game (for example, refer to FIGS. 15A and 15B). Various data related to the game medium may be included in the game data.

The ability setting unit 32 additionally sets the same ability as at least one ability of the first game medium in the second game medium in a case where the predetermined condition is established. For example, additional ability data that associates the identification information of the second game medium with identification information of the ability to be additionally set may be stored in the storage unit of the terminal apparatus 20A by including the additional ability data in the user data. In this case, the additional ability data is referred to in the case of exhibiting the ability of the game medium. Various data related to the ability may be included in the game data.

Next, the operation of the game system 100 (system 100) of this embodiment will be described.

Figure 2:
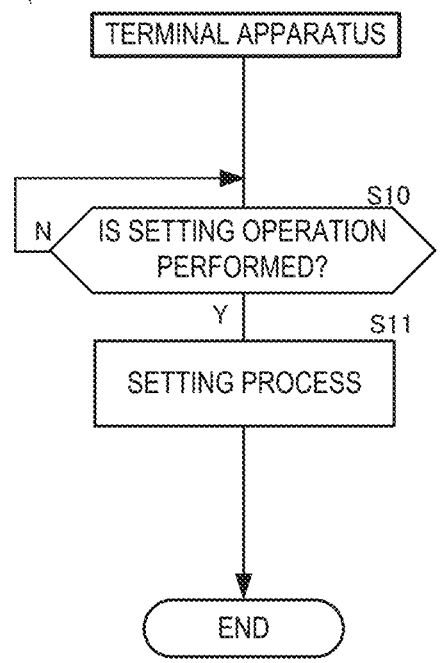
FIG. 2 is a flowchart illustrating an example of a relationship setting process corresponding to at least one embodiment of the present invention.

FIG. 2 is a flowchart illustrating an example of a relationship setting process executed by the system 100. In the relationship setting process, a process for setting the predetermined relationship between the first game medium and the second game medium selected by the user is performed. Hereinafter, a case where the terminal apparatus 20A executes the relationship setting process will be illustratively described.

The relationship setting process of the example of the present embodiment is executed by using an operation input of the user for starting relationship setting as a trigger.

In the relationship setting process, the terminal apparatus 20A waits until the setting operation of the predetermined relationship is performed from the user (step S10). For example, in a case where the user selects the first game medium and the second game medium from the plurality of game media by operating the operation unit, the terminal apparatus 20A determines that the setting operation is performed. In a case where the setting operation is performed (step S10: YES), the terminal apparatus 20A performs a setting process (step S11). For example, as described above, the terminal apparatus 20A may store the relationship data associating the identification information of the first game medium with the identification information of the second game medium in the storage unit by including the relationship data in the user data. Then, the terminal apparatus 20A finishes the relationship setting process.

In the relationship setting process, while illustration is not provided, the terminal apparatus 20A finishes the relationship setting process in a case where the user performs a cancelation operation.

Figure 3:
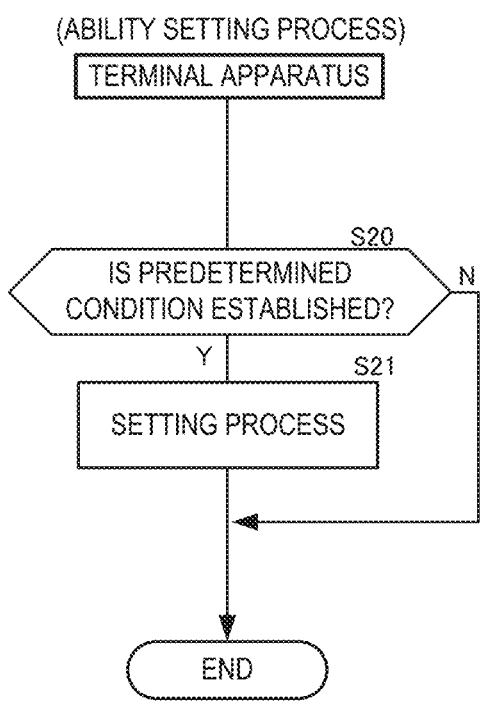
FIG. 3 is a flowchart illustrating an example of an ability setting process corresponding to at least one embodiment of the present invention.

FIG. 3 is a flowchart illustrating an example of an ability setting process executed by the system 100. In the ability setting process, a process for additionally setting the same ability as at least one ability of the first game medium in the second game medium is performed. Hereinafter, a case where the terminal apparatus 20A executes the ability setting process will be illustratively described.

The ability setting process of the example of the present embodiment is executed by using an operation input of the user for starting ability setting as a trigger.

In the ability setting process, the terminal apparatus 20A determines whether or not the predetermined condition is established (step S20). For example, as described above, the terminal apparatus 20A may determine that the predetermined condition is established in a case where the predetermined event (training) is executed on the selected second game medium by consuming the predetermined item. In this case, the terminal apparatus 20A may include record data of the executed event in the user data and determine whether or not the event is executed by referring to the user data.

In a case where the predetermined condition is established (step S20: YES), the terminal apparatus 20A performs the setting process (step S21). For example, as described above, the terminal apparatus 20A may store the additional ability data associating the identification information of the second game medium with the identification information of the ability to be additionally set in the storage unit by including the additional ability data in the user data. Accordingly, the additionally set ability can be exhibited for the second game medium. Then, the terminal apparatus 20A finishes the ability setting process. In a case where the predetermined condition is not established (step S20: NO), the terminal apparatus 20A finishes the ability setting process.

The ability setting process may be periodically executed regardless of the operation of the user.

As described above, as one aspect of the first embodiment, the terminal apparatus 20A is configured to include the relationship setting unit 31 and the ability setting unit 32. Thus, the ability of the game medium designated by the user can be exhibited by another game medium designated by the user. Accordingly, the degree of freedom of the user in ability setting of the game medium is improved.

Figure 4:
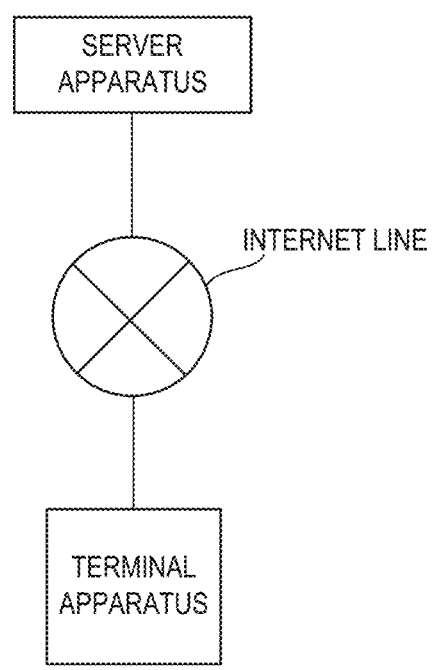
FIG. 4 is a block diagram illustrating an example of the configuration of the game system corresponding to at least one embodiment of the present invention.

In the example of the first embodiment, the terminal apparatus 20A controls the progress of the game by executing the game program. However, the present invention is not particularly limited to the example. For example, as illustrated in FIG. 4, a configuration in which a game system includes a server apparatus and a terminal apparatus and the server apparatus includes at least the relationship setting unit 31 and the ability setting unit 32 instead of the terminal apparatus 20A may be available.

The server apparatus includes a storage unit such as a hard disk drive, a control unit configured with a CPU or the like, and the like, not illustrated. The server apparatus controls the progress of the video game in the same manner as the terminal apparatus 20A by causing the control unit to execute the game program stored in the storage unit. The server apparatus has general configurations such as the control unit and a communication unit for controlling the progress of the video game. Such configurations will not be described in detail.

The server apparatus does not execute the video game in the same manner as the terminal apparatus 20A. For example, the server apparatus includes the communication unit connected to an Internet line (communication network) and communicates with the terminal apparatus executing the video game. The server apparatus receives an operation signal (operation information) from the user (terminal apparatus) and transmits information (image information or the like) related to the progress of the game to the terminal apparatus. A plurality of server apparatuses may cooperate to execute the game program, or the server apparatus and the terminal apparatus may cooperate to execute the game program (control the progress of the game).

Figure 5:
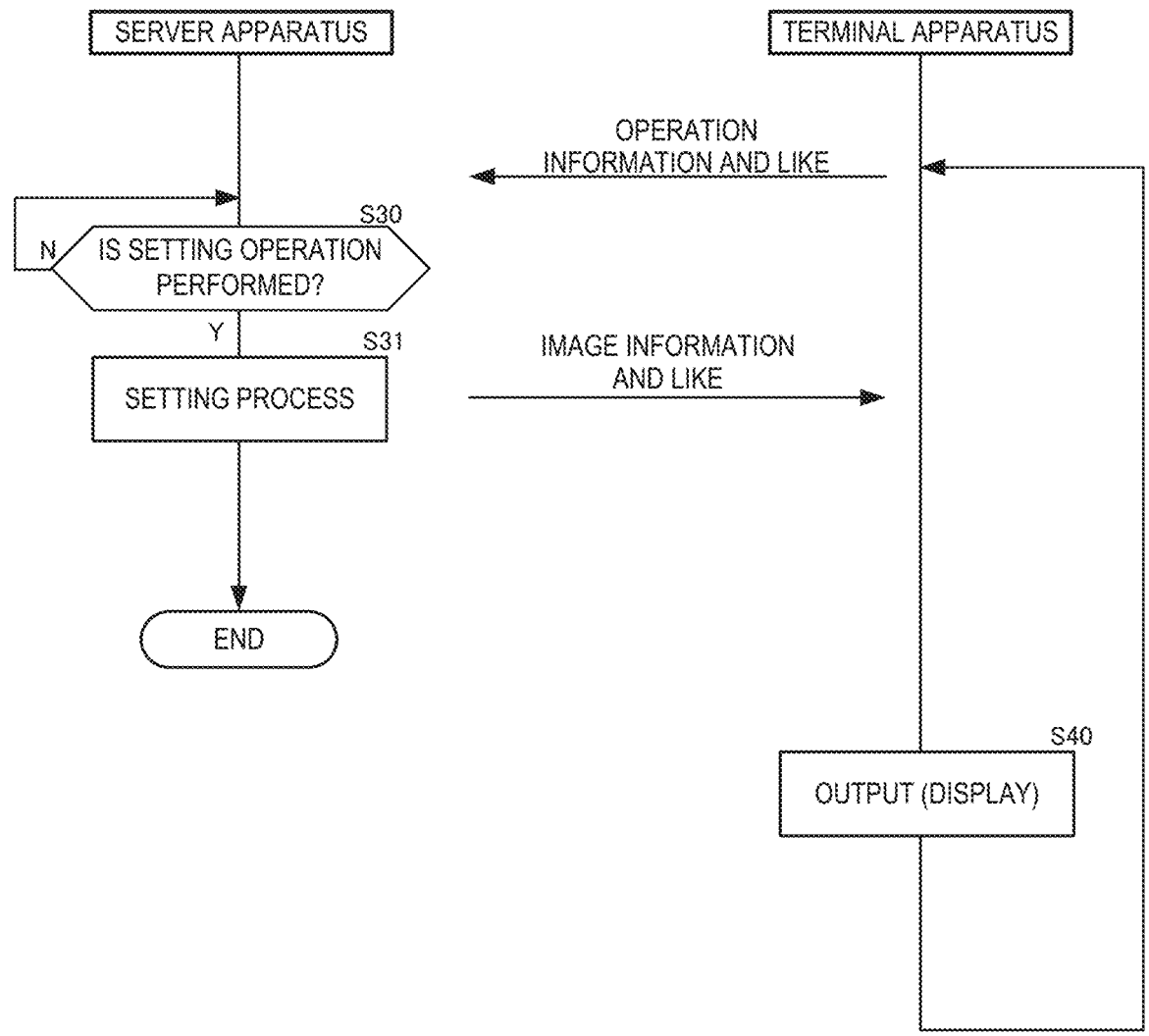
FIG. 5 is a flowchart illustrating an example of operation of a server apparatus and a terminal apparatus corresponding to at least one embodiment of the present invention in a case where the server apparatus executes the relationship setting process.

FIG. 5 is a flowchart illustrating an example of operation of the server apparatus and the terminal apparatus in a case where the server apparatus executes the relationship setting process illustrated in FIG. 2.

In the relationship setting process, the server apparatus waits until the setting operation of the predetermined relationship is performed from the user (step S30). For example, the terminal apparatus transmits the identification information of the first game medium and the second game medium selected from the plurality of game media by the user operating the operation unit to the server apparatus. In a case where the server apparatus receives the identification information of the first game medium and the second game medium, the server apparatus determines that the setting operation is performed. In a case where the setting operation is performed (step S30: YES), the server apparatus performs the setting process (step S31). For example, as described above, the server apparatus may store the relationship data associating the identification information of the first game medium with the identification information of the second game medium in the storage unit of the server apparatus by including the relationship data in the user data. Then, the server apparatus finishes the relationship setting process.

The server apparatus periodically receives the operation information or the like of the operation unit from the terminal apparatus and transmits, for example, the image information for generating the game image for selection of the first game medium and the second game medium to the terminal apparatus. The terminal apparatus outputs (displays on the display unit) the game image based on the received image information (step S40).

In the relationship setting process, while illustration is not provided, the server apparatus finishes the relationship setting process in a case where the user performs the cancelation operation.

Figure 6:
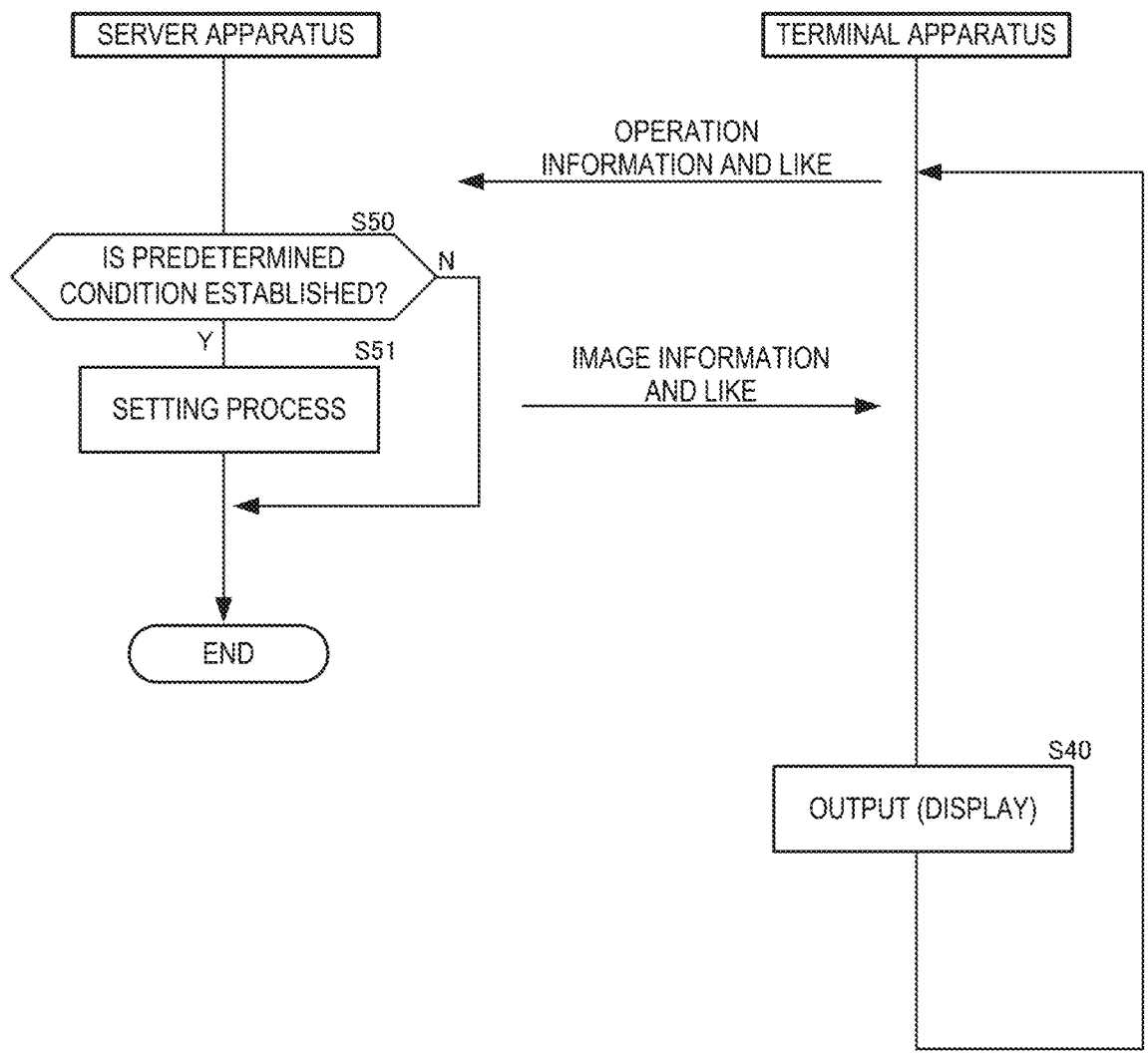
FIG. 6 is a flowchart illustrating an example of operation of the server apparatus and the terminal apparatus corresponding to at least one embodiment of the present invention in a case where the server apparatus executes the ability setting process.

FIG. 6 is a flowchart illustrating an example of operation of the server apparatus and the terminal apparatus in a case where the server apparatus executes the ability setting process illustrated in FIG. 3.

In the ability setting process, the server apparatus determines whether or not the predetermined condition is established (step S50). For example, as described above, the server apparatus may determine that the predetermined condition is established in a case where the predetermined event (training) is executed on the selected second game medium by consuming the predetermined item. In this case, the server apparatus may include the record data of the executed event in the user data and determine whether or not the event is executed by referring to the user data.

In a case where the predetermined condition is established (step S50: YES), the server apparatus performs the setting process (step S51). For example, as described above, the server apparatus may store the additional ability data associating the identification information of the second game medium with the identification information of the ability to be additionally set in the storage unit of the server apparatus by including the additional ability data in the user data. Accordingly, the additionally set ability can be exhibited for the second game medium. Then, the server apparatus finishes the ability setting process. In a case where the predetermined condition is not established (step S50: NO), the server apparatus finishes the ability setting process.

The server apparatus periodically receives the operation information or the like of the operation unit from the terminal apparatus and transmits, for example, the image information for generating the game image for notification of additional setting of the ability of the second game medium to the terminal apparatus. The terminal apparatus outputs (displays on the display unit) the game image based on the received image information (step S40).

Any relationship can be applied to the "predetermined relationship". For example, a master-student relationship in which the first game medium is a master and the second game medium is a student of the master which is the first game medium corresponds to the predetermined relationship. In this case, for example, the second game medium may learn the ability of the master (first game medium) by executing training (event) on the second game medium which is the student (predetermined condition).

The "game" may employ a game of any genre such as a role playing game, a caring game, or a rhythm game as long as the game is configured to include the game medium exhibiting the ability. In addition, the game may be a single player game played by a single user or a multiplayer game played by a plurality of users at the same time.

Any game medium may be applied to the "plurality of game media" as long as the game medium has the ability. In addition, for example, only the game medium possessed by the user may be set as a setting target of the predetermined relationship.

The "exhibition (activation)" of the ability means generation of an effect of the ability. For example, exhibition of the passive skill "attack power increase" is generation of an effect of increasing the attack power of the game medium of the user by a predetermined amount. In addition, for example, exhibition of the attack skill which is the active skill is generation of an effect of causing the character or the like to execute the attack skill.

Each of the first game medium and the second game medium in the example of the embodiment is not limited to one game medium. For example, two game media may be selected as the first game medium, and one game medium may be selected as the second game medium. In this case, the ability of each of the two game media which are the first game medium may be additionally set in the one game medium which is the second game medium. In addition, for example, two game media may be selected as the first game medium, and two game media may be selected as the second game medium. In this case, the ability of each of the two game media which are the first game medium may be additionally set in each of the two game media which are the second game medium.

In the example of the embodiment, even in a case where the same ability as the ability of the first game medium is additionally set in the second game medium, the ability of the first game medium is maintained to be exhibitable. However, the present invention is not limited to such a configuration. For example, the ability of the first game medium may be set to be non-exhibitable in a case where the ability is additionally set in the second game medium.

Furthermore, in the example of the embodiment, an upper limit of the number of set predetermined relationships may be either set or not set. In the case of setting the upper limit, any numerical value may be set as the number of the upper limit.

Second Embodiment

Figure 7:
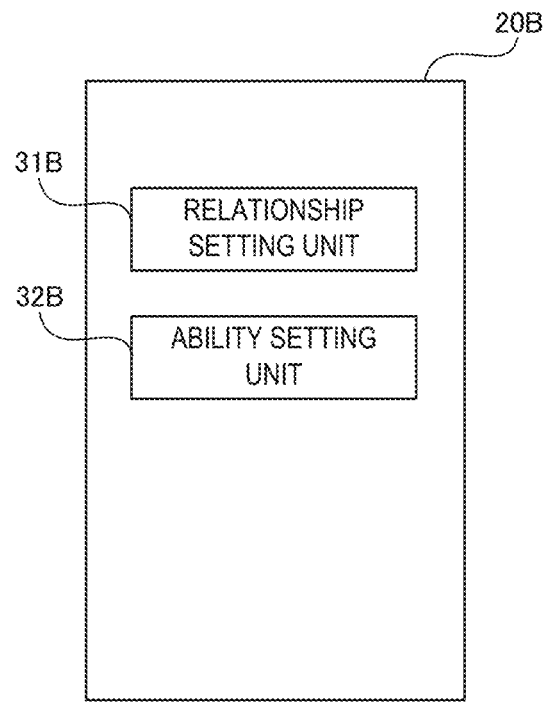
FIG. 7 is a block diagram illustrating an example of a configuration of the terminal apparatus corresponding to at least one embodiment of the present invention.

FIG. 7 is a block diagram illustrating a configuration of a terminal apparatus 20B that is an example of the terminal apparatus 20. In the present example, the terminal apparatus 20B includes at least a relationship setting unit 31B and an ability setting unit 32B.

The relationship setting unit 31B sets the predetermined relationship between the first game medium and the second game medium selected from the plurality of game media based on the setting operation of the user. For example, the relationship data associating the identification information of the first game medium with the identification information of the second game medium may be stored in a storage unit of the terminal apparatus 20B by including the relationship data in the user data. The relationship setting unit 31B discards setting of the predetermined relationship in a case where the user performs a setting discarding operation. That is, the user can set the predetermined relationship and discard the setting. For example, the relationship setting unit 31B may discard the setting of the predetermined relationship by deleting the relationship data stored in the storage unit from the user data.

The ability setting unit 32B additionally sets the same ability as at least one ability of the first game medium in the second game medium in a case where the predetermined condition is established. For example, the additional ability data associating the identification information of the second game medium with the identification information of the ability to be additionally set may be stored in the storage unit of the terminal apparatus 20B by including the additional ability data in the user data. The ability setting unit 32B discards additional setting of the ability by discarding the predetermined relationship. That is, the ability which is additionally set in the second game medium and is the same as the ability of the first game medium is removed along with discarding of the predetermined relationship. For example, the ability setting unit 32B may discard the additional setting by deleting the additional ability data stored in the storage unit from the user data.

Figure 8:
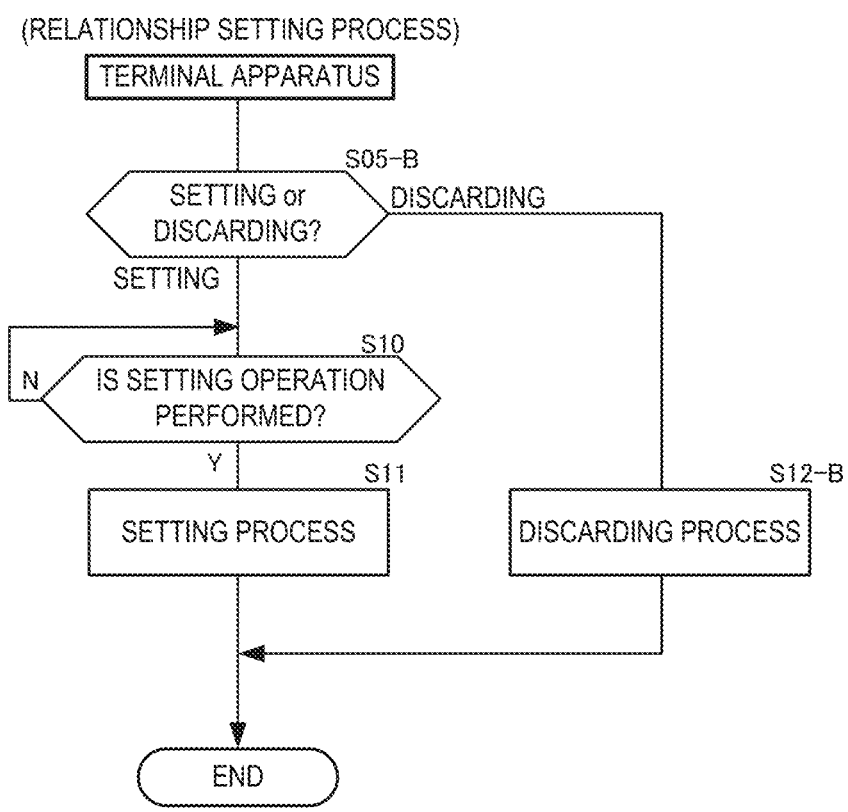
FIG. 8 is a flowchart illustrating an example of the relationship setting process corresponding to at least one embodiment of the present invention.

FIG. 8 is a flowchart illustrating an example of the relationship setting process executed by the system 100. In the relationship setting process, a process for setting the predetermined relationship between the first game medium and the second game medium selected by the user is performed. Hereinafter, a case where the terminal apparatus 20B executes the relationship setting process will be illustratively described. A flowchart illustrating the operation of the server apparatus will not be described from the viewpoint of avoiding duplicate description.

The relationship setting process of the example of the present embodiment is executed by using the operation input of the user for starting relationship setting as a trigger.

In the relationship setting process, the terminal apparatus 20B determines whether setting of the predetermined relationship or discarding of the setting is selected based on the operation information of the user (step S05-B). For example, the terminal apparatus 20B may determine the content of selection based on the operation information of the operation unit provided by the user. In a case where setting of the predetermined relationship is selected, the terminal apparatus 20B waits until the setting operation of the predetermined relationship is performed from the user (step S10). For example, in a case where the user selects the first game medium and the second game medium from the plurality of game media by operating the operation unit, the terminal apparatus 20B determines that the setting operation is performed. In a case where the setting operation is performed (step S10: YES), the terminal apparatus 20B performs the setting process (step S11). For example, as described above, the terminal apparatus 20B may store the relationship data associating the identification information of the first game medium with the identification information of the second game medium in the storage unit by including the relationship data in the user data. Then, the terminal apparatus 20B finishes the relationship setting process.

In the process of step S05-B, in a case where discarding of the setting is selected (setting discarding operation is performed), the terminal apparatus 20B performs a discarding process (step S12-B). In the discarding process, discarding (deletion) of the setting of the predetermined relationship and discarding (deletion) of the ability of the second game medium additionally set along with setting of the predetermined relationship are performed. For example, as described above, the terminal apparatus 20B may delete the relationship data and the additional ability data stored in the storage unit from the user data.

In the relationship setting process, while illustration is not provided, the terminal apparatus 20B finishes the relationship setting process in a case where the user performs the cancelation operation. The ability setting process in the example of the present embodiment is the same as in the example of the first embodiment illustrated in FIG. 3 and thus, will not be described.

As described above, as one aspect of the second embodiment, the terminal apparatus 20B is configured to include the relationship setting unit 31B and the ability setting unit 32B. Thus, the ability of the game medium designated by the user can be exhibited by another game medium designated by the user. Accordingly, the degree of freedom of the user in ability setting of the game medium is improved.

In a case where the predetermined relationship is discarded, additional setting of the ability is also discarded. Thus, destruction of the worldview or the like of the game due to an excessive increase in the degree of freedom of the user in ability setting of the game medium is prevented.

Each of the first game medium and the second game medium in the example of the embodiment is not limited to one game medium. For example, two game media may be selected as the first game medium, and one game medium may be selected as the second game medium. In this case, the ability of each of the two game media which are the first game medium may be additionally set in the one game medium which is the second game medium. In addition, for example, two game media may be selected as the first game medium, and two game media may be selected as the second game medium. In this case, the ability of each of the two game media which are the first game medium may be additionally set in each of the two game media which are the second game medium.

In the example of the embodiment, even in a case where the same ability as the ability of the first game medium is additionally set in the second game medium, the ability of the first game medium is maintained to be exhibitable. However, the present invention is not limited to such a configuration. For example, the ability of the first game medium may be set to be non-exhibitable in a case where the ability is additionally set in the second game medium.

In the example of the embodiment, the upper limit of the number of set predetermined relationships may be either set or not set. In the case of setting the upper limit, any numerical value may be set as the number of the upper limit.

Third Embodiment

Figure 9:
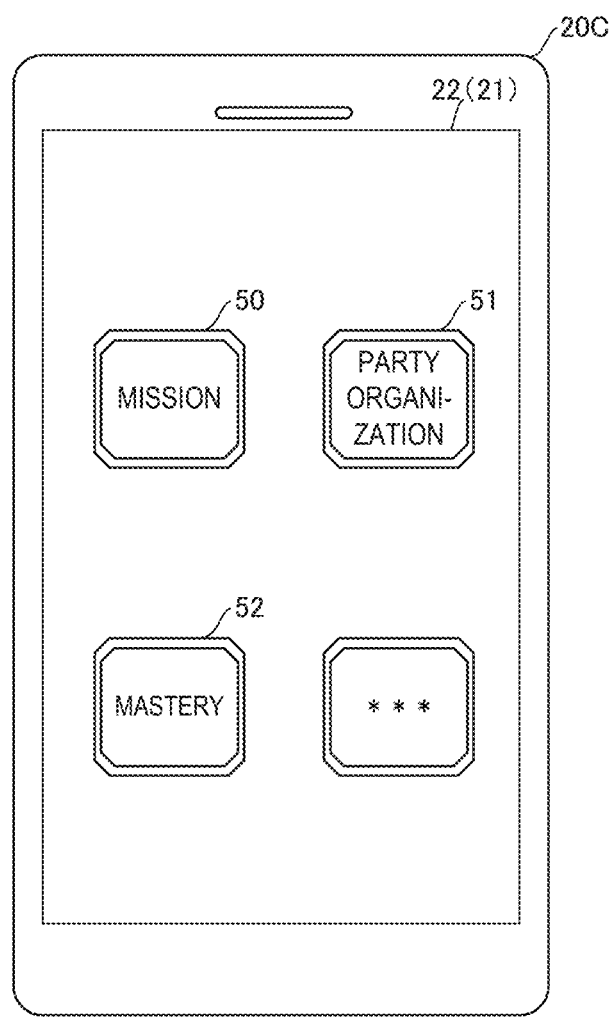
FIG. 9 is a front view illustrating an exterior of the terminal apparatus corresponding to at least one embodiment of the present invention.

FIG. 9 is a front view illustrating the exterior of a terminal apparatus 20C that is an example of the terminal apparatus 20. The terminal apparatus 20C of the example of the present embodiment is a mobile phone terminal (smartphone) having a communication function of communicating with another terminal apparatus through a communication network such as the Internet. The terminal apparatus 20C includes a display unit 22 or the like having a touch panel 21. The touch panel 21 is an operation unit that is arranged on a display screen of the display unit 22 and receives the operation input of the user. For example, the display unit 22 is a liquid crystal display apparatus and displays the game image of the game (application) of the example of the present embodiment.

The terminal apparatus 20C provides the game to the user by displaying the game image on the display unit 22 as illustrated in FIG. 9 by executing an application program (game program) stored in a storage unit of the terminal apparatus 20C. In the game of the example of the present embodiment, a predetermined story progresses by sequentially clearing a plurality of missions (virtual duties) using one party formed with three characters. The game image illustrated in FIG. 9 is one example of a game image of a home screen.

Images of icons 50 to 52 and the like corresponding to execution menus "mission", "party organization", and "mastery" of the game are displayed on the home screen. The user can execute (play) the execution menus corresponding to the icons 50 to 52 by selecting the display positions (touch panel 21) of the icons 50 to 52 by tapping on the home screen.

In a case where the icon 50 is selected, the execution menu "mission" is executed. The mission means a content for causing the user to play using the game medium such as the character for the purpose of accomplishing a preset task. In the game of the example of the present embodiment, a plurality of missions are present. The user can select and execute one mission from the plurality of displayed missions after tapping the icon 50.

Figure 10:
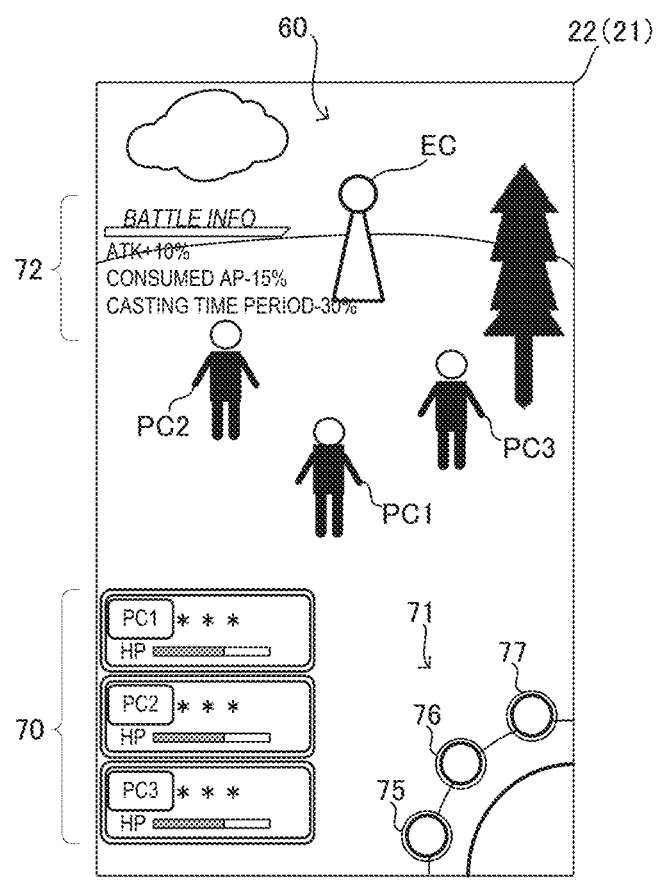
FIG. 10 is a diagram illustrating one example of a game image corresponding to at least one embodiment of the present invention.

The mission of the example of the present embodiment is a battle with an enemy character. Specifically, in a game space 60 illustrated in FIG. 10, a mission of a battle between three characters PC1 to PC3 of a party of the user and an enemy character EC is executed. FIG. 10 is a diagram illustrating one example of a combat screen (game image) between the enemy character EC and the characters PC1 to PC3 of the user in a certain mission. The number of characters of the party is not particularly limited to three. In the example of the present embodiment, the user performs an attack or the like on the enemy character EC by operating one character PC1 forming the party. The remaining characters PC2 and PC3 not operated by the user are AI characters operated by the terminal apparatus 20C (CPU).

The combat screen illustrated in FIG. 10 includes a status region 70, a battle skill region 71, an information region 72, and the like. In the status region 70, images illustrating the health points (HP) and the like of the characters PC1 to PC3 are displayed. In the battle skill region 71, images and the like of icons 75 to 77 for causing the character PC1 operated by the user to execute a battle skill are displayed. The character PC1 executes the corresponding battle skill by causing the user to tap the display positions (touch panel 21) of the icons 75 to 77. The battle skill is a motion capable of dealing a greater damage than a normal attack such as the attack skill to the enemy character. That is, the battle skill is the active skill (ability) of the character activated in accordance with the operation (execution instruction) of the user. The character PC1 can also execute operations such as the normal attack and movement by causing the user to perform tapping, swiping, and the like on the touch panel 21 other than the icons 75 to 77.

In the information region 72, information related to a combat status is displayed. For example, the contents of talents (passive skills) activated by the characters PC1 to PC3 of the user are displayed. In the example of the present embodiment, the passive skills of the characters PC1 to PC3 are activated during the combat regardless of the operation of the user. That is, the passive skill is activated on condition that the combat (mission) is being executed.

The passive skill of the example of the present embodiment includes, for example, "ATK+10%" and "movement speed UP" (refer to FIG. 18). The passive skill "ATK+10%" generates an effect of increasing the attack power of the characters PC1 to PC3 of the party by 10% from a normal value at all times during the combat. The passive skill "movement speed UP" generates an effect of increasing the movement speed of a character PC having the ability of the passive skill by 50% from a normal value.

One mission is finished in a case where the set task is accomplished, or a case where all of the characters PC1 to PC3 forming the party of the user are set to a combat unavailable state (HP=0). For example, the task is defeating (making unavailable to combat) all enemy characters EC appearing in the game space 60.

Next, in a case where the icon 51 illustrated in FIG. 9 is selected, the execution menu "party organization" is executed. In the party organization, a game image of an organization screen (not illustrated) is displayed, and characters to participate (form the party) in the mission are organized. For example, three characters to form the party are decided by causing the user to select (party organization operation) three characters from a plurality of possessed characters on the organization screen (not illustrated).

Next, in a case where the icon 52 illustrated in FIG. 9 is selected, the execution menu "mastery" is executed. In the mastery, setting of the master-student relationship between characters and discarding of the set master-student relationship can be performed. In addition, in the mastery, training can be executed on the character which is the student in the master-student relationship. For example, the user can select execution of any of setting or discarding of the master-student relationship and training by operating the touch panel 21 after selecting the icon 52.

The "master-student relationship" means a relationship between the master and the student. In the example of the present embodiment, the master-student relationship can be set for a plurality of characters possessed by the user. Specifically, as illustrated in FIG. 11, the master-student relationship is set by causing the user to select one character to be set as the master and one character to be set as the student from the plurality of characters possessed by the user.

Figure 11:
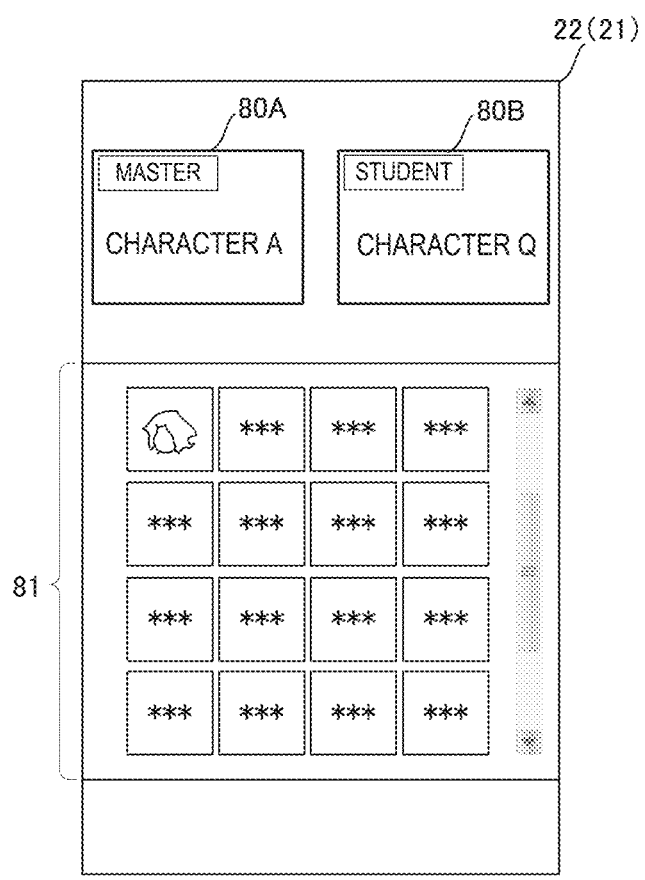
FIG. 11 is a diagram illustrating one example of the game image corresponding to at least one embodiment of the present invention.

FIG. 11 is a diagram illustrating one example of a game image of a setting screen for the master-student relationship. The setting screen includes designation regions 80A and 80B and a candidate list region 81. In the designation region 80A, an image (for example, a name) related to the character selected as the master is displayed. In the designation region 80B, an image (for example, a name) related to the character selected as the student is displayed. In the candidate list region 81, images (for example, face images of the characters) related to the characters possessed by the user are displayed. The setting screen illustrated in FIG. 11 illustrates a state where the character of the master and the character of the student are already selected.

First, the user taps the display position (touch panel 21) of the character to be set as the master from the plurality of characters displayed in the candidate list region 81 on the setting screen. Accordingly, the character to be set as the master is selected. Next, the user taps the display position (touch panel 21) of the character to be set as the student from the characters displayed in the candidate list region 81 on the setting screen. Accordingly, the character to be set as the student is selected. Then, the master-student relationship is set by causing the user to tap an icon "decision" (not illustrated).

In the example of the present embodiment, a game medium that is already set to have the master-student relationship (predetermined relationship) cannot be set to have the master-student relationship with another game medium unless the relationship is discarded. The master-student relationship of the example of the present embodiment is a relationship between one master and one student.

In the example of the present embodiment, maximum five master-student relationships can be set. The student for which the master-student relationship is set can learn one talent (passive skill) of the character of the master in a case where a predetermined number of types of training are completed.

The "training" is an event related to the character of the student in the master-student relationship. The "event" means an incident occurring in the game. For example, the event is an event of training such as reinforcement training or a tactics course performed by the student. For example, the student can learn the passive skill of the master in a case where three types of training are executed. A predetermined item (in-game item) in the game is needed for executing training. In the case of performing training, first, the user is caused to select one master-student relationship from combinations of maximum five master-student relationships. Accordingly, a training screen for the student of selected one master-student relationship is displayed.

Figure 12:
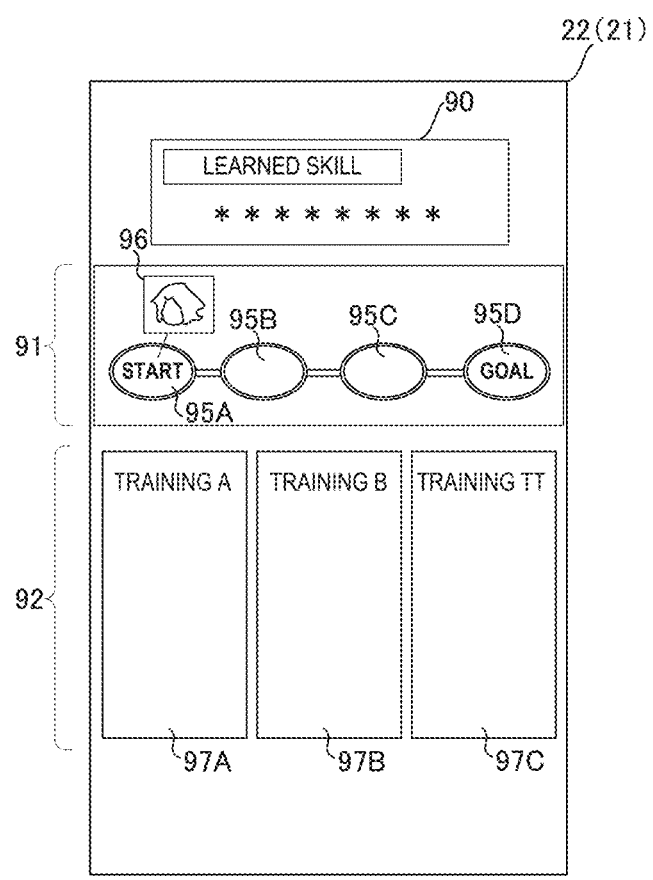
FIG. 12 is a diagram illustrating one example of the game image corresponding to at least one embodiment of the present invention.

FIG. 12 is a diagram illustrating one example of a game image of the training screen. The training screen includes a master skill region 90, a progress region 91, a selection region 92, and the like.

In the master skill region 90, an image (for example, a text image) illustrating a passive skill that is scheduled to be learned by the character of the student is displayed. In the progress region 91, an image illustrating a progress status of training is displayed. Specifically, in the progress region 91, an image in which four blocks 95A to 95D are connected through line segments is displayed, and an image of an icon 96 illustrating the character of the student is displayed. The icon 96 moves from the block 95A in which "START" is displayed toward the block 95D in which "GOAL" is displayed. The character (icon 96) of the student can proceed by one block each time execution of one type of training is finished. That is, in a case where execution of three types of training is finished, the icon 96 reaches the block 95D in which "GOAL" is displayed, and the character of the student learns the passive skill of the character of the master.

Accordingly, in the example of the present embodiment, the character of the master corresponds to the first game medium, and the character of the student corresponds to the second game medium. Execution of three types of training corresponds to the predetermined condition.

The selection region 92 displays the contents (candidates) of three types of training that can be subsequently executed. Specifically, images of icons 97A to 97C are displayed. Each of the icons 97A to 97C includes information such as the content of training and the type and the quantity of the item necessary for execution. Training corresponding to a selected icon is executed by causing the user to select any one of the icons 97A to 97C. An amount of the possessed item of the user necessary for execution is consumed. In a case where the user does not possess the type and the quantity of the item necessary for execution, training is not executed.

For example, the user improves the ability of the character by setting the master-student relationship. By performing the mission by including the character having the improved ability in the party, the mission is more easily accomplished.

Figure 13:
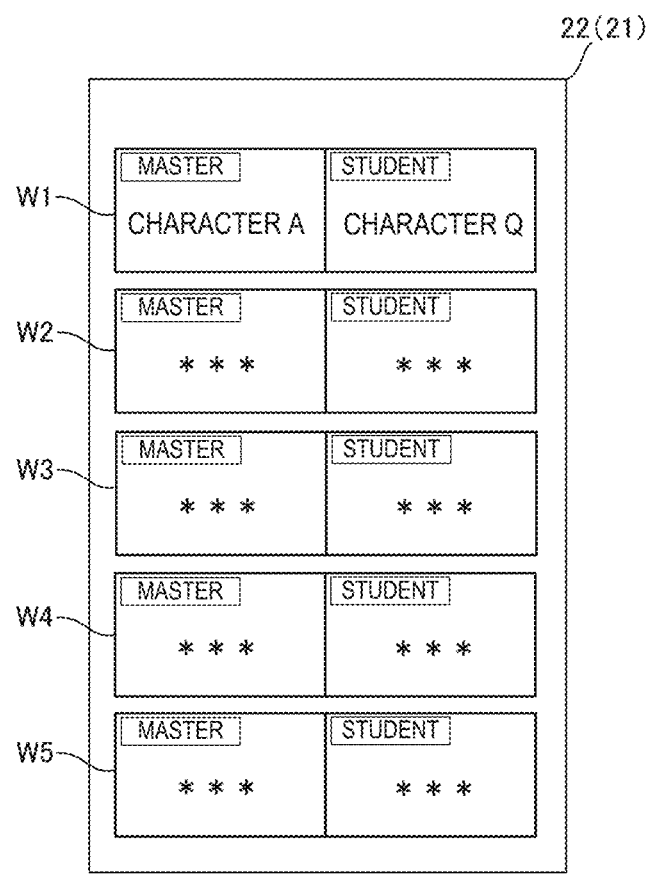
FIG. 13 is a diagram illustrating one example of the game image corresponding to at least one embodiment of the present invention.

In discarding of the master-student relationship, a master-student relationship selected from a plurality of master-student relationships by the user is discarded as illustrated in FIG. 13. FIG. 13 is a diagram illustrating one example of a game image of a discarding screen. Windows W1 to W5 of five master-student relationships are displayed on the discarding screen illustrated in FIG. 13. The master-student relationship to be discarded is selected by causing the user to tap any window W (touch panel 21).

In the example of the present embodiment, while illustration is not provided, a character is drawn by executing an execution menu "drawing". The user possesses a character that is won. That is, the user can acquire various characters in drawing.

The user data or the like may be referred to for data related to the characters possessed by the user, the currently set master-student relationship, the training record (progress status), the possessed item, and the like (refer to FIGS. 15A and 15B).

Figure 14:
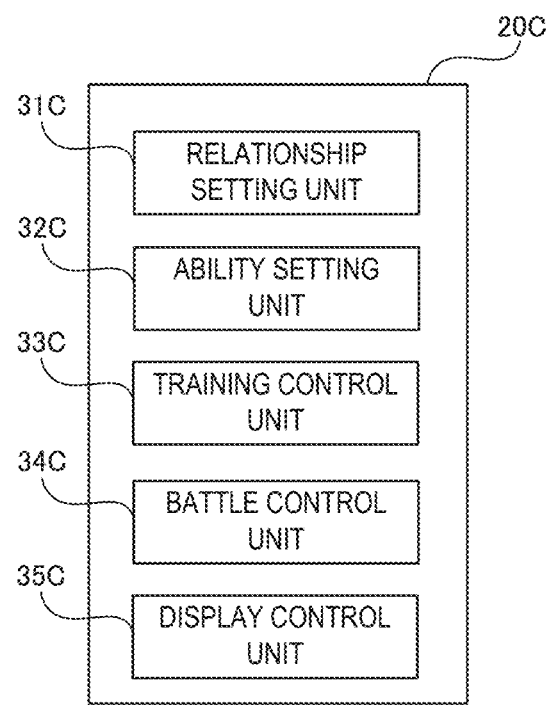
FIG. 14 is a block diagram illustrating an example of the configuration of the terminal apparatus corresponding to at least one embodiment of the present invention.

FIG. 14 is a block diagram illustrating a configuration of the terminal apparatus 20C which is an example of the terminal apparatus 20. In the present example, the terminal apparatus 20C includes at least a relationship setting unit 31C, an ability setting unit 32C, a training control unit 33C, a battle control unit 34C, and a display control unit 35C.

The relationship setting unit 31C sets the predetermined relationship (master-student relationship) between the first game medium and the second game medium selected from the plurality of game media (characters) possessed by the user based on the setting operation of the user. In the example of the present embodiment, as described using FIG. 11, the selection operation of the characters of the master and the student and the operation of the decision button are included in the setting operation.

The relationship setting unit 31C specifies the plurality of game media possessed by the user by referring to the user data. FIG. 15A is a diagram illustrating one example of the user data. The user data is information related to the game of the user and is stored in the storage unit of the terminal apparatus 20C. The terminal apparatus 20C updates the user data in accordance with the progress of the game.

The user data is configured with fields of a user ID, a name, a possessed character, a master-student relationship, a possessed item, a party, and the like. Identification information of the user is set in the field of the user ID. The name, the possessed character, the master-student relationship, the possessed item, and the like are associated with the user ID.

In the field of the name, for example, text data indicating the name of the user in the game is set. In the field of the possessed character, data related to each character possessed by the user is set. The possessed character means a character that can participate in the mission. The relationship setting unit 31C specifies the characters possessed by the user based on the data set in the possessed character.

The field of the possessed character includes fields of a character ID, a level, a master ID, a parameter, and the like as illustrated in FIG. 15B. FIG. 15B is a diagram illustrating one example of a configuration of the possessed character included in the user data.

In the field of the character ID, identification information of the character is set. The level, the master ID, the parameter, and the like are associated with each character ID. In the field of the level, a numerical value indicating the degree of growth (strength) of the character is set. In the field of the master ID, identification information of the passive skill learned by the character by training in the master-student relationship is set. In the field of the parameter, various parameters such as the health point (HP), the attack power, and the defense power of the character are set.

Basic data related to the characters is included in a character list illustrated in FIG. 16. FIG. 16 is a diagram illustrating one character list. The character list is included in the game data.

The character list is configured with fields of the character ID, a name, a battle ID, a passive ID, a permission ID, a basic parameter, and the like. In the field of the character ID, the identification information of the character is set. The name, the battle ID, the passive ID, the permission ID, the basic parameter, and the like are associated with each character ID. In the field of the name, for example, text data indicating the name of the character is set. In the field of the battle ID, identification information (skill ID) of a battle skill that can be activated is set. In the field of the passive ID, identification information (skill ID) of a passive skill that can be activated by the character is set.

In the field of the permission ID, identification information (skill ID) of the passive skill to be learned by the character of the student for which the master-student relationship is set is set.

In the field of the basic parameter, basic values (initial values) of various parameters such as the health point (HP), the attack power, and the defense power of the character are set. The values of the basic parameter are set as the initial values in the parameters (user data) such as the health points of the characters possessed by the user. The numerical values of various parameters of the characters possessed by the user are increased along with growth (leveling up) achieved by executing the mission or the like.

Next, the field of the master-student relationship of the user data will be described. The field of the master-student relationship includes fields of a master ID, a student ID, a training record, and the like. In the field of the master ID, identification information (character ID) of the character of the master is set. As described above, in the example of the present embodiment, data of maximum five master-student relationships is set in the field of the master-student relationship.

In the field of the training record, identification information (training ID) of training executed by the character of the student in the corresponding master-student relationship is set. In a case where three training IDs are set as the training record, such a case indicates a state where the student in the master-student relationship can learn the passive skill of the master. In addition, in the field of the training record, identification information (for example, "MASTER") indicating that learning is completed is set in a case where learning of the passive skill is completed. The relationship setting unit 31C performs setting of the master-student relationship and discarding of the setting by updating the data of the field of the master-student relationship of the user data.

Next, the field of the possessed item of the user data will be described. In the field of the possessed item, information about items such as a healing item usable by the user is set. For example, identification information (item ID) and information about the number of items are set.

Next, the field of the party of the user data will be described. In the field of the party, identification information (character ID) of the character to participate in the mission is set. In the example of the present embodiment, identification information of three characters is set.

Next, the ability setting unit 32C illustrated in FIG. 14 additionally sets the same ability as at least one ability of the first game medium in the second game medium in a case where three types of training are executed (predetermined condition is established). Specifically, the ability setting unit 32C refers to the training record in the master-student relationship of the user data and specifies a master-student relationship that is in a state where three types of training are executed and the passive skill is not additionally set. Then, the ability setting unit 32C additionally sets the passive skill in the master ID of the possessed character (user data) for the character of the student in the specified master-student relationship. The additionally set passive skill (skill ID) is a passive skill (skill ID) set in the permission ID of the character (character ID) of the master. In the example of the present embodiment, only one skill ID is set in the permission ID of the character. That is, in the example of the present embodiment, one passive skill is learned in one master-student relationship.

For example, learning of the passive skill is completed in the master-student relationship between the master (character ID: CH004) and the student (character ID: CH001) illustrated in FIG. 15A. Thus, as illustrated in FIG. 15B, the passive skill (skill ID: PS110) of the master is set as the master ID of the student (character ID: CH001). The number of abilities (skills) that can be learned in one master-student relationship may not be one.

The ability setting unit 32C discards additional setting of the ability by discarding the master-student relationship. That is, along with discarding of the master-student relationship, the passive skill (skill ID) set in the master ID (user data) of the student in the discarded master-student relationship is deleted.

Next, the training control unit 33C illustrated in FIG. 14 controls the progress of training. Specifically, the training control unit 33C instructs the display control unit 35C to generate the game image of the training screen illustrated in FIG. 12 by referring to a training list illustrated in FIG. 17, the user data, and the like. FIG. 17 is a diagram illustrating one example of the training list. The training list includes data related to a plurality of types of training executable by the student. The training list is included in the game data. The training list is configured with fields of a training 1D, a name, a consumed item ID, a consumed quantity, and the like. In the field of the training ID, identification information of training is set. The name, the consumed item ID, the consumed quantity, and the like are associated with the training ID.

In the field of the name, for example, text data indicating the name of training is set. For example, the name is used for displaying the selection region 92 of the training screen illustrated in FIG. 12. In the consumed item ID, identification information (item ID) of the item necessary for executing corresponding training is set. In the consumed quantity, the quantity of the necessary item is set.

The training control unit 33C consumes the necessary item and executes training selected by the user. Specifically, the training control unit 33C deletes the necessary quantity of the item necessary for training selected by the user from the possessed item of the user data. Then, the training control unit 33C additionally sets the identification information (training ID) of the executed training in the training record of the corresponding master-student relationship (user data). Training of the example of the present embodiment does not need the operation of the user during training, and a configuration for determining the success and failure of training is not present.

Next, the battle control unit 34C illustrated in FIG. 14 controls the progress of the mission (combat). Specifically, the operation of the character PC forming the party of the user is controlled based on the operation and the like of the user by referring to the user data and the like. In addition, the operation of the enemy character EC which is a battle opponent of the user is controlled. For example, the battle control unit 34C activates the passive skills of the characters PC to PC3 forming the party during the combat. That is, the passive skill specified by the skill ID set in the passive ID (character list) and the master ID (possessed character of the user data) of each of the characters PC to PC3 is activated. More specifically, the battle control unit 34C activates the passive skill by referring to the skill ID, a passive skill list illustrated in FIG. 18, and the like.

FIG. 18 is a diagram illustrating one example of the passive skill list. The passive skill list is configured with fields of a skill ID, a name, an activation effect, and the like and is included in the game data. In the field of the skill ID, the identification information of the passive skill is set. The name, the activation effect, and the like are associated with the skill ID. In the field of the name, for example, text data indicating the name of the passive skill is set. In the field of the activation effect, an effect caused by activating the passive skill is set.

The battle control unit 34C decreases the health point and the like of each character based on damage caused by attack. The battle control unit 34C determines whether or not the user accomplishes the task of the mission. Mission data (not illustrated) included in the game data may be referred to for information related to execution of the mission.

Furthermore, the battle control unit 34C decides the game medium to participate in the combat from the plurality of game media (characters) possessed by the user based on the party organization operation. That is, the battle control unit 34C performs the party organization of setting the character selected by the user as the character forming the party of the mission. Specifically, the battle control unit 34C sets the identification information (character ID) of the character selected by the user in the party of the user data.

Next, the display control unit 35C illustrated in FIG. 14 generates the game images illustrated in FIG. 9 to FIG. 13 and the like and displays the game images on the display unit 22 in accordance with the progress of the game.

FIG. 19 is a flowchart illustrating an example of a game progress process executed by the system 100. In the game progress process, a processor the like for executing the execution menu selected by the user is performed. Hereinafter, a case where the terminal apparatus 20C executes the game progress process will be illustratively described. Processes related to the relationship setting process and the ability setting process are mainly illustrated in FIG. 19, and other processes may not be described.

The game progress process of the example of the present embodiment is executed by using the operation input of the user for starting execution of the game as a trigger.

In the game progress process, the terminal apparatus 20C determines which execution menu is selected based on the operation information of the user (step S100-C). Specifically, the terminal apparatus 20C displays the game image of the home screen illustrated in FIG. 9 and determines which execution menu (icons 50 to 52) is tapped.

In a case where the icon 50 of the mission is selected, the terminal apparatus 20C executes a battle process (step S110-C). In the battle process, as described above, the combat screen illustrated in FIG. 10 is displayed, and the progress of the combat between the characters PC1 to PC3 of the party of the user and the enemy character EC is controlled. In the battle process, the characters PC1 to PC3 activate the passive skill during the combat. After the mission is finished, the terminal apparatus 20C returns to the process of step S100-C.

Next, in a case where the icon 51 of the party organization is selected, the terminal apparatus 20C executes an organization process (step S160-C). In the organization process, as described above, an organization screen is displayed, and three characters forming the party of the user are decided based on the party organization operation of the user. That is, the three characters (character IDs) are set in the party of the user data.

Next, in a case where the icon 52 of the mastery is selected, the terminal apparatus 20C determines which of setting or discarding of the master-student relationship and training is to be executed based on the operation information of the user (step S120-C). In a case where setting or discarding of the master-student relationship is selected, the terminal apparatus 20C executes the relationship setting process (step S130-C). The relationship setting process will be described later. After the relationship setting process is finished, the terminal process 20C returns to the process of step S100-C.

In a case where training is selected, a training process is executed (step S140-C). In the training process, as described above, the training screen illustrated in FIG. 12 is displayed, and training is executed on the character of the student for which the master-student relationship is set. The possessed item and the training record of the user data are updated along with execution of training. Then, the terminal apparatus 20C performs the ability setting process on the character of the student (step S150-C). The ability setting process will be described later. After the ability setting process is finished, the terminal process 20C returns to the process of step S100-C.

Figure 20:
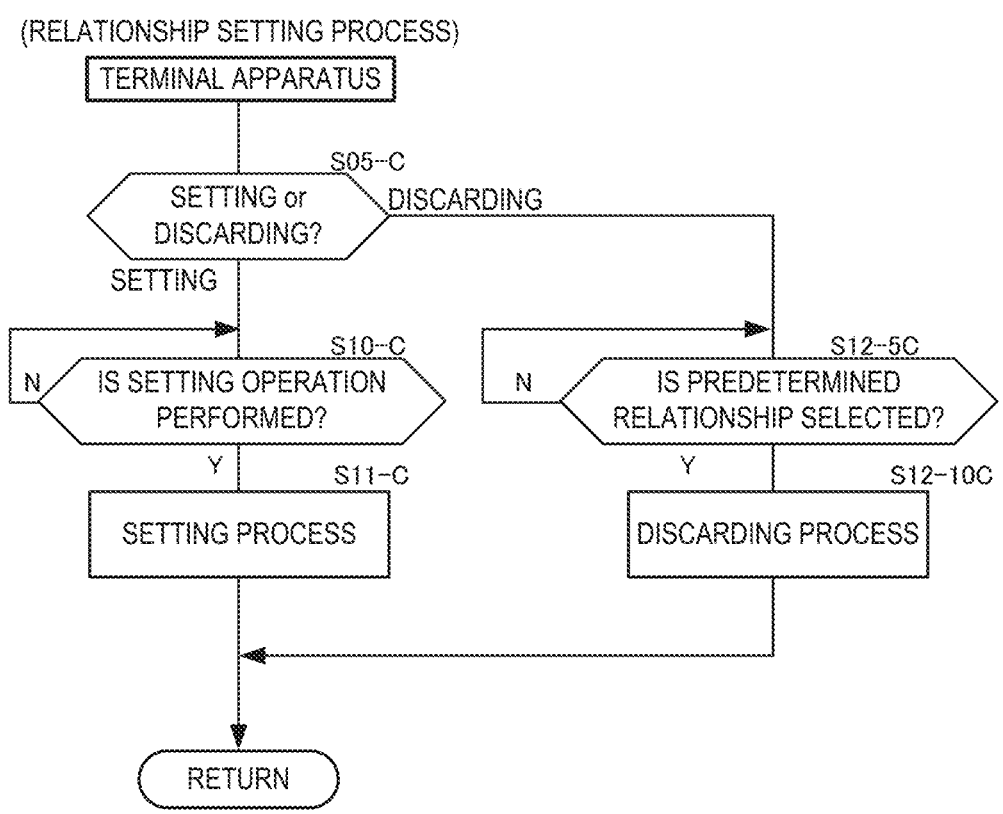
FIG. 20 is a flowchart illustrating an example of the relationship setting process corresponding to at least one embodiment of the present invention.

FIG. 20 is a flowchart illustrating an example of the relationship setting process executed by the system 100. In the relationship setting process, a process for setting the predetermined relationship between the first game medium and the second game medium selected by the user is performed. Hereinafter, a case where the terminal apparatus 20C executes the relationship setting process will be illustratively described. A flowchart illustrating the operation of the server apparatus will not be described from the viewpoint of avoiding duplicate description.

As described above, the relationship setting process of the example of the present embodiment is executed by using a determination that setting or discarding of the master-student relationship is selected in the game progress process (step S120-C) as a trigger.

In the relationship setting process, the terminal apparatus 20C determines whether setting of the master-student relationship or discarding of the master-student relationship is selected based on the operation information of the user (step S05-C). In a case where setting of the master-student relationship is selected, the terminal apparatus 20C waits until the setting operation of the predetermined relationship is performed from the user (step S10-C). In a case where the characters of the master and the student are selected and the decision button is selected on the setting screen of the master-student relationship illustrated in FIG. 11, it is determined that the setting operation is performed. In a case where the setting operation is performed (step S10-C: YES), the terminal apparatus 20C performs the setting process (step S11-C). The terminal apparatus 20C sets the identification information (character ID) of the character of the master and the identification information (character ID) of the character of the student in the master-student relationship of the user data. Then, the terminal apparatus 20C finishes the relationship setting process.

In a case where discarding of the master-student relationship is selected in the process of step S05-C, the terminal apparatus 20C waits until the master-student relationship to be deleted is selected (step S12-5C). In a case where the user selects one master-student relationship to be deleted from maximum five master-student relationships (step S12-5C: YES), the terminal apparatus 20C performs the discarding process (step S12-10C). The terminal apparatus 20C deletes data of the selected master-student relationship from the user data and also deletes data of the master ID of the character of the student in this master-student relationship. Then, the terminal apparatus 20C finishes the relationship setting process.

In the relationship setting process, while illustration is not provided, the terminal apparatus 20C finishes the relationship setting process in a case where the user performs the cancelation operation.

FIG. 21 is a flowchart illustrating an example of the ability setting process executed by the system 100. In the ability setting process, a process for additionally setting the same ability (passive skill) as at least one ability of the first game medium in the second game medium is performed. Hereinafter, a case where the terminal apparatus 20C executes the ability setting process will be illustratively described.

As described above, the ability setting process of the example of the present embodiment is executed after execution of the training process (step S140-C) is finished in the game progress process.

In the ability setting process, the terminal apparatus 20C determines whether or not the predetermined condition is established (step S20-C). As described above, the terminal apparatus 20C refers to the training record (user data) of each master-student relationship of the user data and determines whether or not there is a master-student relationship that is in a state where three types of training are executed and the passive skill is not additionally set. In a case where the master-student relationship in the above state is present, the terminal apparatus 20C determines that the predetermined condition is established.

In a case where the predetermined condition is established (step S20-C: YES), the terminal apparatus 20C performs the setting process (step S21-C). As described above, the terminal apparatus 20C sets the skill ID of the permission ID of the character (character ID) of the master in the master ID (user data) of the specified student (character ID). Accordingly, the additionally set ability can be exhibited for the second game medium (character of the student). Then, the terminal apparatus 20C finishes the ability setting process. In a case where the predetermined condition is not established (step S20-C: NO), the terminal apparatus 20C finishes the ability setting process.

The ability setting process may be periodically executed regardless of the operation of the user.

As described above, as one aspect of the third embodiment, the terminal apparatus 20C is configured to include the relationship setting unit 31C, the ability setting unit 32C, the training control unit 33C, the battle control unit 34C, and the display control unit 35C. Thus, the ability of the game medium (character) designated by the user can be exhibited by another game medium (character) designated by the user. Accordingly, the degree of freedom of the user in ability setting of the game medium is improved.

In a case where the predetermined relationship (master-student relationship) is discarded, additional setting of the ability is also discarded. Thus, destruction of the worldview or the like of the game due to an excessive increase in the degree of freedom of the user in ability setting of the game medium is prevented.

For the game progress process of the examples of the embodiments, a configuration in which a game system includes a server apparatus and a terminal apparatus as illustrated in FIG. 4 and the server apparatus executes the game progress process may be available.

In the examples of the embodiments, the master-student relationship is applied as the predetermined relationship. However, the present invention is not particularly limited to the example. For example, a parent-child relationship may be available. The upper limit of the number of set predetermined relationships may not be set.

In the examples of the embodiments, the setting target of the predetermined relationship (master-student relationship) is only the character (game medium) possessed by the user. However, the present invention is not particularly limited to the example. For example, characters that are possessed by the user and have the same attribute may be set as the setting target. The attribute includes characteristics, sex, a type, and the like associated with the character. For example, a role (responsibility) such as an attacker, a shooter, or a healer set for the character corresponds to the attribute. In this case, the master-student relationship can be set between characters of the attacker.

In the examples of the embodiments, the passive skill is configured to be additionally set as the ability. However, the present invention is not particularly limited to the example. For example, the battle skill (active skill) may be configured to be additionally set.

In the examples of the embodiments, the game medium which is already set to have the master-student relationship (predetermined relationship) cannot be set to have the master-student relationship with another game medium unless the relationship is discarded. Alternatively, a plurality of master-student relationships may be set for the same game medium at the same time.

In the examples of the embodiments, the master-student relationship is configured to be set between one master and one student (one-on-one). However, the present invention is not particularly limited to the example. For example, two game media may be selected as the first game medium, and one game medium may be selected as the second game medium. In this case, the ability of each of the two game media which are the first game medium may be additionally set in the one game medium which is the second game medium. In addition, for example, two game media may be selected as the first game medium, and two game media may be selected as the second game medium. In this case, the ability of each of the two game media which are the first game medium may be additionally set in each of the two game media which are the second game medium.

In the examples of the embodiments, even in a case where the same ability as the ability of the master is additionally set in the student, the ability of the master is maintained to be exhibitable. However, the present invention is not limited to such a configuration. For example, in a case where the ability is additionally set in the student, the master may not exhibit the additionally set ability.

In the examples of the embodiments, the event (training) is executed by consuming the item possessed by the user. However, the present invention is not particularly limited to the example. For example, the event may be executed by consuming a predetermined parameter related to the user. Specifically, a parameter of an event point that is a numerical value is used. The event point may be configured to be increased in accordance with the progress of the game such as clearing of the mission and consumed (decreased) along with execution of the event.

The event (training) of the examples of the embodiments is configured to progress without needing the operation of the user. Alternatively, the event may be configured to need the operation of the user. In addition, for example, an event in which a determination of success and failure is performed may be employed. In this case, additional setting of the ability may be performed by successfully performing the event.

In the examples of the embodiments, execution of the predetermined number of events (training) is the predetermined condition. However, the present invention is not particularly limited to the example. For example, consumption of a predetermined in-game item may be set as the predetermined condition.

APPENDIX

The embodiments are described in order for those having ordinary knowledge in the field of the invention to be capable of embodying at least the following invention.

[1]
A game program causing a computer to implement a function of controlling progress of a video game in which a virtual game medium exhibits an ability in the game, a relationship setting function of setting a predetermined relationship between a first game medium and a second game medium selected from a plurality of game media based on a setting operation of a user, and an ability setting function of additionally setting the same ability as at least one ability of the first game medium in the second game medium in a case where a predetermined condition is established.

[2]
The game program according to [1], in which a function of discarding setting of the predetermined relationship in a case where the user performs a setting discarding operation is implemented in the relationship setting function, and a function of discarding additional setting of the ability along with the discarding is implemented in the ability setting function.

[3]
The game program according to [1], in which the predetermined condition includes execution of a predetermined event by consuming an in-game item possessed by the user or a predetermined parameter possessed by the user.

[4]
The game program according to [1], in which a function of setting the predetermined relationship between the first game medium and the second game medium selected from the plurality of game media possessed by the user is implemented in the relationship setting function.

[5]
The game program according to [1], further causing the computer to implement a battle control function of controlling progress of a combat in which the user and a battle opponent battle using a game medium, and exhibiting an ability of the game medium during the combat.

[6]
The game program according to [5], in which a function of deciding the game medium to be used in the combat from the plurality of game media possessed by the user based on a party organization operation of the user is implemented in the battle control function.

[7]
A server apparatus on which the game program according to [1] is installed.

[8]
A terminal program causing a game terminal apparatus to implement a function of executing a video game by displaying a game screen on a display screen of a display unit, the terminal program causing the terminal apparatus to implement a connection function of connecting to the server apparatus according to [7] through a communication network.

[9]
A game terminal apparatus on which the game program according to [1] is installed.

[10]
A game program causing a server apparatus to control progress of a video game, the server apparatus being connected to a game terminal apparatus executing the video game in which a virtual game medium exhibits an ability in the game through a communication network, the game program causing the server apparatus to implement a relationship setting function of setting a predetermined relationship between a first game medium and a second game medium selected from a plurality of game media based on a setting operation of a user, and an ability setting function of additionally setting the same ability as at least one ability of the first game medium in the second game medium in a case where a predetermined condition is established.

[11]
The game program according to [10], in which a function of discarding setting of the predetermined relationship in a case where the user performs a setting discarding operation is implemented in the relationship setting function, and a function of discarding additional setting of the ability along with the discarding is implemented in the ability setting function.

[12]
The game program according to [10], in which the predetermined condition includes execution of a predetermined event by consuming an in-game item possessed by the user or a predetermined parameter possessed by the user.

[13]
The game program according to [10], in which a function of setting the predetermined relationship between the first game medium and the second game medium selected from the plurality of game media possessed by the user is implemented in the relationship setting function.

[14]
The game program according to [10], further causing the server apparatus to implement a battle control function of controlling progress of a combat in which the user and a battle opponent battle using a game medium, and exhibiting an ability of the game medium during the combat.

[15]
The game program according to [14], in which a function of deciding the game medium to be used in the combat from the plurality of game media possessed by the user based on a party organization operation of the user is implemented in the battle control function.

[16]
A game system including a game terminal apparatus executing a video game in which a virtual game medium exhibits an ability in the game, and a server apparatus connected to the game terminal apparatus through a communication network, the game system including a relationship setter configured to set a predetermined relationship between a first game medium and a second game medium selected from a plurality of game media based on a setting operation of a user, and an ability setter configured to additionally set the same ability as at least one ability of the first game medium in the second game medium in a case where a predetermined condition is established.

[17]

The game system according to [16], in which the relationship setter discards setting of the predetermined relationship in a case where the user performs a setting discarding operation, and the ability setter discards additional setting of the ability along with the discarding.

[18]

The game system according to [16], in which the predetermined condition includes execution of a predetermined event by consuming an in-game item possessed by the user or a predetermined parameter possessed by the user.

[19]

The game system according to [16], in which the relationship setter sets the predetermined relationship between the first game medium and the second game medium selected from the plurality of game media possessed by the user.

[20]

The game system according to [16], further including a battle controller configured to control progress of a combat in which the user and a battle opponent battle using a game medium, and exhibiting an ability of the game medium during the combat.

[21]

The game system according to [20], in which the battle controller decides the game medium to be used in the combat from the plurality of game media possessed by the user based on a party organization operation of the user.

[22]

A game terminal apparatus causing a computer to implement a function of controlling progress of a video game in which a virtual game medium exhibits an ability in the game, the game terminal apparatus including relationship setter configured to set a predetermined relationship between a first game medium and a second game medium selected from a plurality of game media based on a setting operation of a user, and an ability setter configured to additionally set the same ability as at least one ability of the first game medium in the second game medium in a case where a predetermined condition is established.

[23] A game progress control method of causing a computer to control progress of a video game in which a virtual game medium exhibits an ability in the game, the game progress control method including a relationship setting process of setting a predetermined relationship between a first game medium and a second game medium selected from a plurality of game media based on a setting operation of a user, and an ability setting process of additionally setting the same ability as at least one ability of the first game medium in the second game medium in a case where a predetermined condition is established.

One embodiment of the present invention is useful for improving the degree of freedom of the user in ability setting of the game medium in the video game in which the virtual game medium exhibits the ability.

What is claimed is:

1. A non-transitory computer-readable medium including a game program causing a computer to execute functions comprising:

controlling progress of a video game including a virtual game medium, wherein the virtual game medium is configured to exhibit an ability in the game, the ability being a skill that is set for the virtual game medium;

selecting a first game medium and a second game medium from a plurality of virtual game media responsive to an entry of a relationship setting operation of a user;

setting a predetermined relationship between the first game medium and the second game medium;

storing user data including relationship data indicative of the predetermined relationship in a storage;

additionally setting the same ability as at least one ability of the first game medium in the second game medium if a predetermined condition is established responsive to an entry of an ability setting operation of the user; and storing the user data further including additional ability data indicative of the same ability additionally set in the second game medium in the storage.

2. The non-transitory computer-readable medium according to claim 1, wherein the functions further comprises:

discarding the relationship data and the additional ability data responsive to an entry of a setting discarding operation by the user.

3. The non-transitory computer-readable medium according to claim 1, wherein the predetermined condition includes execution of a predetermined event by consuming an in-game item possessed by the user or a predetermined parameter possessed by the user.

4. The non-transitory computer-readable medium according to claim 1, wherein setting the predetermined relationship between the first game medium and the second game medium comprises selecting the first game medium and the second game medium from the plurality of game media possessed by the user.

5. The non-transitory computer-readable medium according to claim 1, wherein the functions further comprises:

controlling progress of a combat in which the user; and a battle opponent battle using a game medium; and exhibiting an ability of the game medium during the combat.

6. The non-transitory computer-readable medium according to claim 5, wherein controlling the progress of the battle comprises deciding the game medium to be used in the combat from the plurality of game media possessed by the user responsive to a party organization operation of the user.

7. A non-transitory computer-readable medium including a game program causing a server apparatus, connected to a game terminal apparatus configured to execute the game program through a communication network, to execute functions comprising:

controlling progress of the video game including a virtual game medium configured to exhibits an ability in the game through the communication network, the ability being a skill that is set for the virtual game medium;

selecting a first game medium and a second game medium from a plurality of game media responsive to an entry of a relationship setting operation of a user;

setting a predetermined relationship between the first game medium and the second game medium;

storing user data including relationship data indicative of the predetermined relationship in a storage;

additionally setting the same ability as at least one ability of the first game medium in the second game medium if a predetermined condition is established responsive to an entry of an ability setting operation of the user; and storing the user data further including additional ability data indicative of the same ability additionally set in the second game medium in the storage.

8. A game system comprising:

a game terminal apparatus configured to execute a video game including a virtual game medium configured to exhibits an ability in the game, the ability being a skill that is set for the virtual game medium;

a server apparatus connected to the game terminal apparatus through a communication network;

at least one processor; and at least one memory including at least one set of instructions that, when executed by the at least one processor, causes the at least one processor to perform operations comprising:

selecting a first game medium and a second game medium from a plurality of game media responsive to an entry of a relationship setting operation of a user;

setting a predetermined relationship between flail the first game medium and flail the second game medium;

storing user data including relationship data indicative of the predetermined relationship in a storage;

additionally setting the same ability as at least one ability of the first game medium in the second game medium if a predetermined condition is established responsive to an entry of an ability setting operation of the user; and storing the user data further including additional ability data indicative of the same ability additionally set in the second game medium in the storage.

* * * * *